Aug. 29, 1961 W. M. HUYCK ET AL 2,998,306
TELLTALE FOR ETHYLENE OXIDE STERILIZATION
Filed April 15, 1960

INVENTORS
WILLARD M. HUYCK
VINCENT A. ROMITO
BY
ATTORNEY

2,998,306
Patented Aug. 29, 1961

2,998,306
TELLTALE FOR ETHYLENE OXIDE STERILIZATION

Willard M. Huyck, Woodland Hills, and Vincent A. Romito, North Hollywood, Calif., assignors to Aseptic Thermo Indicator Company, North Hollywood, Calif., a corporation of California
Filed Apr. 15, 1960, Ser. No. 22,530
8 Claims. (Cl. 23—254)

This invention relates to a telltale device for ethylene oxide sterilization to visually indicate that a required concentration of ethylene oxide has been applied for a necessary time to insure the selected degree of sterilization within a treating vessel or within the contents of a vessel subjected to gas treatment therein.

One object of the invention is to provide a telltale device for ethylene oxide sterilization which will show whether or not the treated materials have been subjected to sterilizing conditions.

Another object is to provide a telltale device for ethylene oxide sterilization which is inexpensive, simple to use, and free from the danger of contaminating the goods being sterilized.

Another object is to provide a telltale device for ethylene oxide which integrates the effect as to sterilization of the concentration of ethylene oxide, the time of contact of the oxide with the goods, and the temperature of treatment.

These and other objects are attained by this invention which will be understood from the following description, reference being made to the accompanying drawing showing several forms of the invention, in which FIG. 1 is a plan view of a preferred form of our telltale device;

The efficacy of sterilization by ethylene oxide of goods such as foodstuffs, seeds, grains, bandages, instruments, (particularly plastic instruments which will not withstand heat sterilization) and the like, depends upon a number of factors, the most important of which are the concentration of the ethylene oxide in the sterilizing vessel, the moisture present, the time of contact with the ethylene oxide, and the temperature of treatment. Although one of the principal advantages of ethylene oxide sterilization is that it is effective at ordinary room temperatures if the concentration is high enough and the time long enough, some sterilizers, particularly hospital sterilizers, are operated at temperatures from 100 to 140° F., the higher the temperature the shorter is the necessary time of exposure. Humidity in the range from 40 to 60 percent relative humidity has been found to be most effective, and in practice this range is not usually varied. The effects of time and concentration are inter-related and generally expressed as the lower the concentration, the longer time of exposure required to effect sterilization.

The telltales of this invention measure the integrated effect of time of exposure, the concentration of the ethylene oxide, and the temperature. The telltales depend upon the chemical reaction of ethylene oxide on an aqueous solution of magnesium chloride, by which magnesium hydroxide and epichlorohydrin are produced.

In the presence of a known initial amount of acid, a known minimum amount of ethylene oxide will have been absorbed and reacted when the solution becomes alkaline. This alkalinity is visually shown when an alkaline-acid dye indicator in the telltale changes color, for example, a sodium salt of brom-phenol changes to purple when alkaline from yellow when acid.

Figure 1:
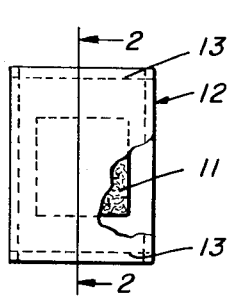
Figure 2:
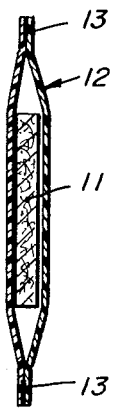
FIG. 2 is a cross-sectional view taken on the line 2—2 of FIG. 1.

Referring to the drawings FIGS. 1 and 2 showing the preferred form of the invention, a pad 11 of absorbent material, for example of blotter paper stock, is enclosed within an envelope 12 of transparent plastic sheet material which has a known permeability to ethylene oxide, the rate of permeation being regulated, in the case of a given material, by the thickness of the sheet. One useful sheet material is composed of polyethylene. The envelope is preferably made from tubular stock, the ends of the tube being heat-sealed. Other sheeted plastics such a cellophane, and laminations of cellophane with other sheeted film materials, may be used. Also synthetic plastic sheets which have been coated on one or both sides by dipping or spraying with other film forming synthetic resin materials may be employed. The objective is to provide a sheeted material in the envelope or sleeve which by its inherent permeability to ethylene oxide may be selected as to thickness and composition so that the time of attaining a selected concentration of ethylene oxide within the envelope may be regulated.

The sleeve type envelope shown in the drawing is eventually sealed as at 13, but before sealing a liquid indicator composition is absorbed in a standardized pad of blotter paper. In order to control the time-concentration sensitivity, it is desirable to add the same quantity of indicator liquid to each piece of blotter, and this may be done by an automatic or manual ejector device which delivers a fixed amount of the indicator liquid to each piece of blotter. For example, using blotter paper pads ¾"x¾"x⅟₁₆", a charge of 0.3 ml. of a standardized indicator reaction liquid is placed upon and absorbed into the pads before the envelopes are sealed.

The indicator reaction liquid consists essentially of (a) an aqueous magnesium chloride solution, (b) an indicator dye, (c) an acid, and (d) a thickening agent to assist in holding the reaction liquid in the pad 11. The concentration of the aqueous magnesium chloride solution is apparently critical only to the extent that it must supply an excess of magnesium chloride in solution to react with the ethylene oxide which reaches it, and to react therewith to form magnesium hydroxide and epichlorohydrin by the reaction

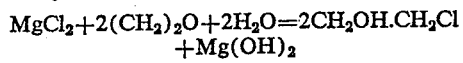

$$MgCl_2 + 2(CH_2)_2O + 2H_2O = 2CH_2OH.CH_2Cl + Mg(OH)_2$$

The acid ingredient may be any acid which will react with the magnesium hydroxide produced in the above chemical reaction, the concentration of acid being selected so that when sufficient ethylene oxide concentration has been reached (in the goods being sterilized) for a length of time at least long enough to effect sterilization, the contained acid in the telltale will have been neutralized by the magnesium hydroxide produced, thus leaving the indicator liquid alkaline, and causing a color change in the dye indicator.

The dye indicator in the indicator reaction liquid may be one of many well known acid-alkali indicators, such as, for example, bromphenol blue, and methyl red, which change color sharply when an acid solution approaches the neutral point (pH 7). The sodium salt of bromphenol blue (tetrabromophenol-sulphon phthalein) is the preferred dye indicator which changes from yellow to blue or purple as the alkalinity increases.

The thickening agent may be one of many viscosity-increasing or gelling agents which are effective in aqueous solutions, such as the cellulose ethers, for examples methyl cellulose and ethyl cellulose, and equivalent materials. The amount of the particular thickening agent is selected to give the desired viscosity in the liquid, including high viscosities which produce an apparently solid condition.

A preferred indicator reaction liquid consists of

| | Parts by weight |
|---|---|
| Water | 1000 |
| Magnesium chloride ($MgCl_2 6H_2O$) | 680 |
| Bromphenol blue, sodium salt | 17 |
| Aqueous hydrochloric acid (1 normal) | 3 to 30 |
| Thickening agent (Dow Chemical Co. 60 HG Methocel viscosity 50 cps.) | 28 |

When 0.3 ml. of this indicator reaction liquid is used to wet the blotter pads of ¾″ x ¾″ x ⅛″ dimensions enclosed within envelopes made of polyethylene of 4 mils thickness, the color changes from yellow to blue in the following time intervals, when the acidity of the liquid originally is of the concentrations indicated:

| | Minutes |
|---|---|
| 0.1 normal HCl | 30 |
| 0.3 normal HCl | 45 |
| 0.5 normal HCl | 60 |
| 1.0 normal HCl | 75 |

For comparison, when the envelope was made of a laminated film of polyethylene and cellophane, the color change in the 1 normal acid solution was effected in 4 hours.

Figure 3:
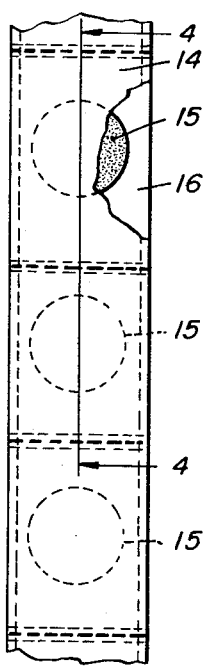
FIG. 3 is a plan view of another form of our telltale device.
Figure 4:
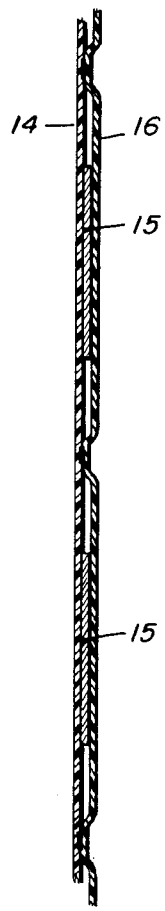
FIG. 4 is a cross-sectional view taken on the line 4—4 of FIG. 3.

In another form of the invention, as shown particularly in FIGS. 3 and 4, the envelope (as above described) is omitted but is replaced, effectively, by producing thin tablets or "spots" of the reactive material on a cellophane backing, and providing a covering of synthetic resinous film forming material which has a selected permeability for ethylene oxide gas. In the preferred form of this type indicator, the thin tablets or spots are "printed" on the cellophane base, and subsequently coated, as for example by spraying, with the permeable resinous film. In the drawings, the backing film 14 is provided with "printed" spots 15 by means of a flexographic printing press using an ink containing the indicator reaction liquid. For example, the following flexographic-type ink composition has been used:

| | Parts by weight |
|---|---|
| Magnesium chloride ($MgCl_2 6H_2O$) | 75 |
| Thickening agent (Dow Chem. Co. Methocel 65 HG viscosity 50 cps.) | 56 |
| Aqueous 10 normal hydrochloric acid | 103 |
| Methyl alcohol | 1000 |
| Brom phenol blue, sodium salt | 1 |

When the spots of the above ink composition were formed by printing by use of a flexographic press on a backing consisting of 30 pound bleached sulfate paper, and then more or less dried out particularly to remove the alcohol vehicle but still containing water, the spots turned from yellow to blue in 5 minutes when subjected to a concentration of 450 milligrams of ethylene oxide per liter. After coating or forming laminations over the partly dried out or solidified spots, the time of color change is much longer, being regulated by the thickness or nature of the covering and the backing films.

The covering film 16 may be a sheeted membrane such as polyethylene, cellophane or similar material, or the covering film may be sprayed on as a coating from an emulsion or solution of a film forming material such as polyethylene or the like, following well known procedures for laminating and coating with film forming materials. Either the backing member 14, or the overlaying film 16, or both may be selected of a suitable thickness, permeability and nature so that in a given time at a known concentration of ethylene oxide, the indicator dye in the spot will change in color.

By this means the color change can be retarded to times of one or several hours, depending upon the actual permeability of the films involved, to give telltale indicators corresponding to the actual ethylene oxide sterilizing conditions.

The indicator composition may be applied to paper or other backing sheets in the form of stripes, spots, total coating, or as shaped insignia, and after application may be solidified or set prior to the application of the covering membrane.

The advantages of the telltale will be apparent. They are of low cost, and when attached to, or packed with the goods in sterilizers, show that sufficient ethylene oxide for a sufficiently long time has been in contact with the goods to effect sterilization.

We claim:

1. A telltale device for ethylene oxide sterilization comprising a pad having an indicator liquid absorbed therein, and a membrane of synthetic plastic material enclosing said pad, said membrane being permeable to ethylene oxide gas, said indicator liquid being composed essentially of an aqueous magnesium chloride solution, an acid soluble in said aqueous solution, and an acid-alkali indicator dye dispersed in said liquid.

2. A telltale device for ethylene oxide sterilization comprising a pad having an indicator liquid absorbed therein, and a membrane of synthetic plastic material enclosing said pad, said membrane having a selected permeability to ethylene oxide gas, said indicator liquid being composed essentially of an aqueous magnesium chloride solution, an acid soluble in said aqueoue solution, and an acid-alkali indicator dye dispersed in said liquid.

3. A telltale device for ethylene oxide sterilization comprising a pad having an indicator liquid absorbed therein, and a membrane of synthetic plastic material enclosing said pad, said membrane having a selected permeability to ethylene oxide gas, said indicator liquid being composed essentially of an aqueous magnesium chloride solution, an acid soluble in said aqueous solution, an acid-alkali indicator dye dispersed in said liquid, and a thickening agent for said liquid.

4. A telltale device for ethylene oxide sterilization comprising a sheeted backing member selected from the group consisting of paper and synthetic plastic film, a tablet of ethylene-oxide-sensitive printing ink composition attached to said backing member, and a transparent synthetic plastic covering membrane attached to said backing member over said tablet; said covering membrane being permeable to ethylene oxide.

5. A telltale device for ethylene oxide sterilization comprising a sheeted backing member selected from the group consisting of paper and synthetic plastic film, a printed spot of ethylene-oxide-sensitive ink on said backing member, and a transparent synthetic plastic covering membrane attached to said backing member over said printed spot; said covering membrane being permeable to ethylene oxide.

6. A telltale device for ethylene oxide sterilization comprising a sheeted backing member selected from the group consisting of paper and synthetic plastic film, a printed spot of ethylene-oxide-sensitive ink on said backing member, and a transparent synthetic plastic covering membrane attached to said backing member over said printed spot; said backing member being non-permeable to ethylene oxide, and said covering membrane being permeable to ethylene oxide.

7. A telltale device for ethylene oxide sterilization comprising a sheeted backing member selected from the group consisting of paper and synthetic plastic film, a printed spot of ethylene-oxide-sensitive ink on said backing member, and a synthetic plastic transparent covering membrane attached to said backing member over said printed spots, said backing member being permeable to ethylene oxide.

8. A sheet of severable telltale devices for ethylene oxide sterilization comprising a sheeted backing member selected from the group consisting of paper and synthetic plastic film, a plurality of spots of ethylene-oxide-sensitive ink composition attached to said backing member, and a transparent synthetic plastic covering membrane attached to said backing member over and around each of said printed spots; said covering membrane being permeable to ethylene oxide.

References Cited in the file of this patent

UNITED STATES PATENTS 1,735,219     Steele et al. _____ Nov. 12, 1929

OTHER REFERENCES

German printed application of Heidrich, No. 1,031,545, June 4, 1958.

Notice of Adverse Decision in Interference

In Interference No. 92,683 involving Patent No. 2,998,306, W. M. Huyck and V. A. Romito, TELLTALE FOR ETHYLENE OXIDE STERILIZATION, final judgment adverse to the patentees was rendered Sept. 22, 1964, as to claims 4, 5, 6 and 8.

[*Official Gazette February 23, 1965.*]